United States Patent
Okumura

(10) Patent No.: US 6,747,714 B2
(45) Date of Patent: Jun. 8, 2004

(54) LIQUID CRYSTAL DISPLAY DEVICE AND ELECTRONIC APPARATUS INCORPORATING THE LIQUID CRYSTAL DISPLAY

(75) Inventor: Osamu Okumura, Chino (JP)

(73) Assignee: Seiko Epson Corporation, Tokyo (JP)

( * ) Notice: Subject to any disclaimer, the term of this patent is extended or adjusted under 35 U.S.C. 154(b) by 15 days.

(21) Appl. No.: 09/949,706

(22) Filed: Sep. 12, 2001

(65) Prior Publication Data

US 2002/0036728 A1 Mar. 28, 2002

(30) Foreign Application Priority Data

Sep. 26, 2000 (JP) ........................................ 2000-292519

(51) Int. Cl.[7] ............................................. G02F 1/1335
(52) U.S. Cl. ............................. 349/61; 349/61; 349/62; 349/63; 349/67; 349/70; 349/113; 349/117; 349/114; 349/119
(58) Field of Search ............................ 349/61, 63, 160, 349/64, 62, 65, 158, 112, 118, 76, 78, 179, 181, 186, 70, 113, 116, 119, 117, 67

(56) References Cited

U.S. PATENT DOCUMENTS

| | | | | |
|---|---|---|---|---|
| 4,693,560 A | * | 9/1987 | Wiley | 349/114 |
| 5,838,408 A | * | 11/1998 | Inoue et al. | 349/118 |
| 6,266,108 B1 | * | 7/2001 | Bao et al. | 349/63 |
| 6,396,552 B1 | * | 5/2002 | Brandt et al. | 349/63 |
| 6,414,910 B1 | * | 7/2002 | Kaneko et al. | 368/242 |
| 6,493,051 B2 | * | 12/2002 | Ha et al. | 349/113 |
| 6,552,767 B1 | * | 4/2003 | Kaneko | 349/119 |
| 6,567,141 B1 | * | 5/2003 | Kaneko et al. | 349/117 |
| 6,574,044 B1 | * | 6/2003 | Sahouani et al. | 359/498 |

FOREIGN PATENT DOCUMENTS

| | | |
|---|---|---|
| JP | A 11-174231 | 7/1999 |
| JP | A 11-509014 | 8/1999 |
| JP | 2000-506989 | 6/2000 |
| JP | 2000-506990 | 6/2000 |
| JP | A 2000-321438 | 11/2000 |
| JP | A 2000-329942 | 11/2000 |
| JP | A 2000-352623 | 12/2000 |
| JP | A 2001-4845 | 1/2001 |
| WO | WO99/40480 | 8/1999 |

* cited by examiner

*Primary Examiner*—Nathan J. Flynn
*Assistant Examiner*—Fazli Erdem
(74) *Attorney, Agent, or Firm*—Oliff & Berridge, PLC

(57) ABSTRACT

The invention provides a transflective liquid crystal display with bright transmissive display. The liquid crystal display includes a liquid crystal cell having a liquid crystal held between a pair of substrates, a transflector disposed inside the liquid crystal cell, a backlight disposed outside the liquid crystal cell, and a retardation film disposed between the liquid crystal cell and the backlight. The backlight includes a light guide plate and a light source, a diffusing polarizer disposed on one surface of the light guide plate and a reflector disposed on the other surface. A retardation film, separate from the above retardation film, is provided between the light guide plate and the reflector of the above backlight.

5 Claims, 9 Drawing Sheets

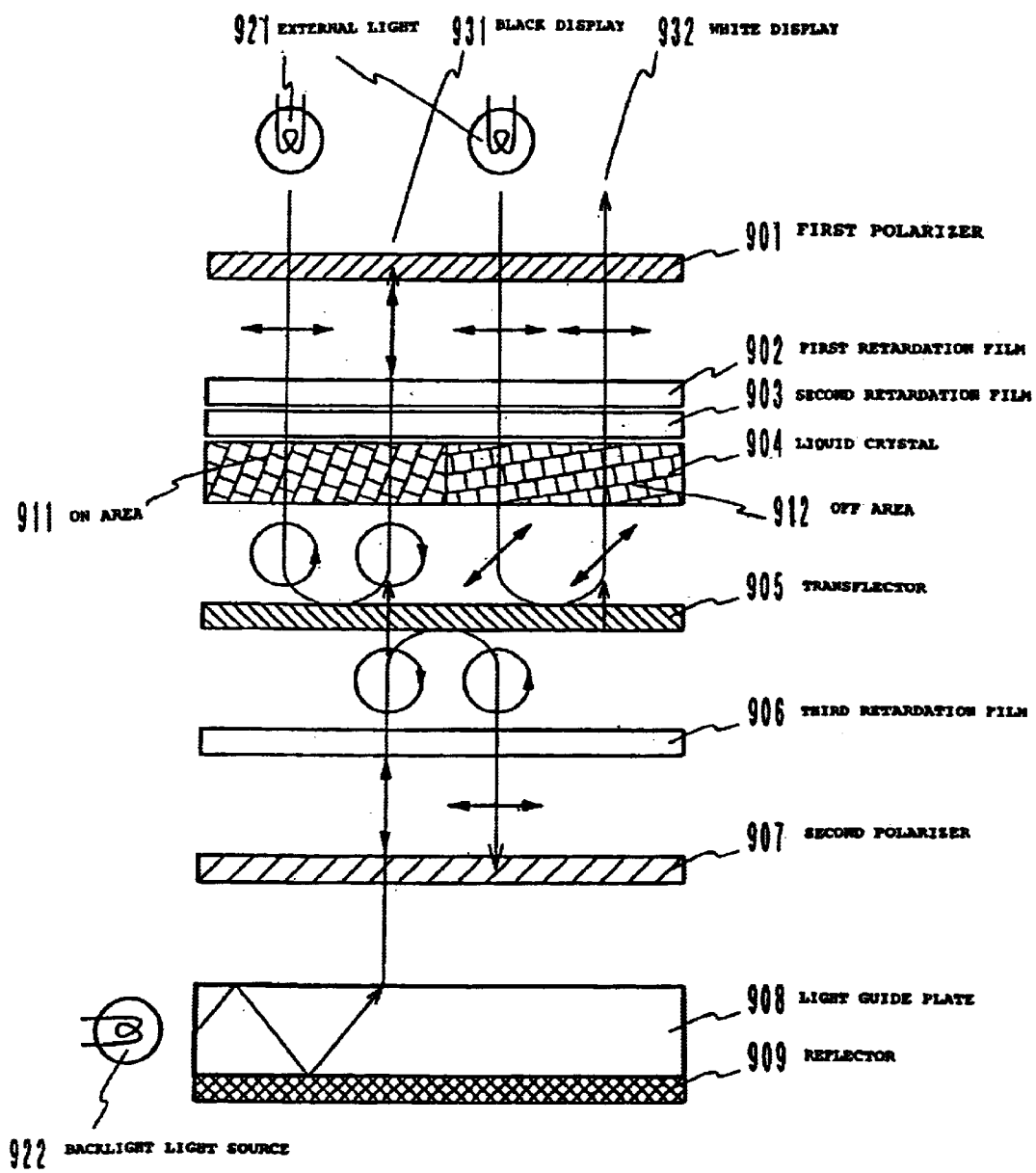

LIQUID CRYSTAL DISPLAY DEVICE AND ELECTRONIC APPARATUS INCORPORATING THE LIQUID CRYSTAL DISPLAY

BACKGROUND OF THE INVENTION

1. Field of Invention

The present invention relates to a liquid crystal display, and more specifically, it relates to a transflective liquid crystal display which can achieve reflective mode display and the transmissive mode display in a switching manner, and an electronic apparatus incorporating the liquid crystal display.

2. Description of Related Art

Reflective liquid crystal displays that achieve display by making use of the external light cannot be viewed in a dark location. Thus, such a reflective liquid crystal display has been typically used as a transflective display having an auxiliary light source. Most reflective color liquid crystal displays which have quickly become popular in recent years are also used as transflective color liquid crystal displays as disclosed, for example, in the following published international application (International Application Number: WO99/40480).

A configuration of a conventional transflective liquid crystal display is described below with reference to FIG. 8. FIG. 8 shows a first polarizer 801, a first retardation film 802, a second retardation film 803, a liquid crystal cell 804, a third retardation film 805, a second polarizer 806, and a backlight 807. The liquid crystal cell 804 includes a first substrate 811 and a second substrate 812, a liquid crystal 813, a scanning electrode 814 disposed on an inner surface of the first substrate 811, and a transflector 815 which is also used as a signal electrode disposed on an inner surface of the second substrate 812. The backlight 807 includes a light guide plate 821 and a reflector 822, and a light source 823.

Next, the operating principle of a conventional transflective liquid crystal display is described below with reference to FIG. 9. FIG. 9 shows a first polarizer 901, a first retardation film 902, a second retardation film 903, a liquid crystal 904, a transflector 905, a third retardation film 906, a second polarizer 907, a light guide plate 908, and a reflector 909. FIG. 9 also shows an ON area 911 of the liquid crystal 904, and an OFF area 912 of the liquid crystal 904. In the ON area 911, the selective voltage is applied to the liquid crystal 904, and the tilt angle, i.e., the angle formed between the liquid crystal molecule and the substrate surface, is increased. On the other hand, in the OFF area 912, the non-selective voltage is applied to the liquid crystal 904, and the tilt angle is decreased.

Firstly, the reflective mode display is described below. An external light 921 is converted into a linearly polarized wave by the first polarizer 901, transmitted through the first retardation film 902, the second retardation film 903 and the liquid crystal 904, and then converted into the circularly polarized wave in the ON area 911, or the linearly polarized wave in the OFF area 912. Thereafter, the light is reflected by the transflector 905, transmitted through the liquid crystal 904, the second retardation film 903, and the first retardation film 902, and converted into the linearly polarized wave orthogonal to the incident polarized wave in the ON area 911, absorbed by the polarizer 901 to form a black display 931, or converted into the linearly polarized wave parallel to the incident polarized wave in the OFF area 912, and transmitted through the polarizer 901 to form a white display 932.

Next, the transmissive mode display is described below. The light emitted from a backlight light source 922 is diffused by frosting or the like (not shown in the figure) cut in the light guide plate 908 while repeating the total reflection in the light guide plate 908, and emitted to the liquid crystal cell side. This light is converted into the linearly polarized wave by the second polarizer 907, and further converted into the circularly polarized wave by the third retardation film 906. Black can be displayed in the ON area 911, and slightly dark white can be displayed in the OFF area 912 by setting this circularly polarized wave so that it is circularly polarized in the same rotational direction as the circularly polarized wave when the external light incident in the ON area 911 of the liquid crystal in the reflective mode display is reflected by the transflector 905, for example, a clockwise circularly polarized wave. On the other hand, the circularly polarized wave reflected downward by the transflector 905 becomes counterclockwise circularly polarized, returned to the linearly polarized wave by the third retardation film 906, and then, absorbed by the second polarizer 907.

However, such a conventional transflective color liquid crystal display has a problem in that the transmissivity is low. As described above, this is attributable to the fact that the light of the backlight reflected by the transflector 905 is absorbed by the second polarizer 907 due to the conversion of the polarized wave by the third retardation film 906. The transmissivity of the transflector 905 is only about 5 to 15%, and thus, 85 to 95% of the light is actually wasted.

SUMMARY OF THE INVENTION

Accordingly, it is an object of the present invention to provide a transflective liquid crystal display of high transmissivity by recycling the light reflected by the transflector to enhance the efficiency of utilization of the light by making use of a backlight having a diffusing polarizer.

A structure in accordance with the present invention to address the above problem is described below.

The liquid crystal display in accordance with the present invention includes a liquid crystal cell having a liquid crystal held between a pair of substrates, a transflector disposed inside the liquid crystal cell, a backlight disposed outside of the liquid crystal cell, and a retardation film disposed between the liquid crystal cell and the backlight. The backlight includes a light guide plate and a light source. A diffusing polarizer is disposed on one side of the light guide plate, and a reflector is disposed on the other side of the light guide plate. The diffusing polarizer is a polarizer having the function of diffusing a predetermined component of the linearly polarized wave, and allowing the other component of the polarized wave to be transmitted. The retardation film has the function of converting the linearly polarized wave incident therein into the substantially circularly polarized wave, and preferably includes at least one ¼ wavelength plate. The diffusing polarizer is preferably adhered to the light guide plate. In the above configuration, the linearly polarized wave is removed from the light guide plate by the diffusing polarizer, and converted into the circularly polarized wave by the retardation film and incident in the transflector. The light reflected by the transflector is also reflected by the reflector of the backlight, and recycled. Since no member that absorbs the light is present therebetween, most of the light of the backlight is transmitted through the transflector, which achieves a transmissive display that is brighter than a conventional transmissive display.

The liquid crystal display in accordance with the present invention further includes a retardation film that is disposed between the light guide plate of the backlight and the reflector. This retardation film also has the function of converting the linearly polarized wave incident therein into a substantially circularly polarized wave, and preferably includes at least one ¼ wavelength plate. In particular, in the above liquid crystal display, the reflector of the backlight preferably has a reflecting surface that is close to a mirror surface, and disturbs no polarized wave. In the above configuration, the light reflected by the transflector is returned to the same polarized state, and recycled, and thus a bright transmissive display with high contrast can be obtained.

An electronic apparatus in accordance with the present invention includes the liquid crystal display according to any one of the above aspects of the present invention discussed above. This configuration provides an advantage of achieving a portable electronic apparatus having a long battery life and having a display that is easy to view.

BRIEF DESCRIPTION OF THE DRAWINGS

FIGS. 7(a)–7(c) are perspective views of examples of electronic apparatus according to the third embodiment of the present invention, wherein FIG. 7(a) shows a cellular phone, FIG. 7(b) shows a watch, FIG. 7(c) shows a portable information apparatus;

FIG. 9 is a schematic explaining the operating principle of a conventional liquid crystal display.

DETAILED DESCRIPTION OF PREFERRED EMBODIMENTS

The present invention will be further described in detail with reference to the drawings.
(First Embodiment)

Figure 1:
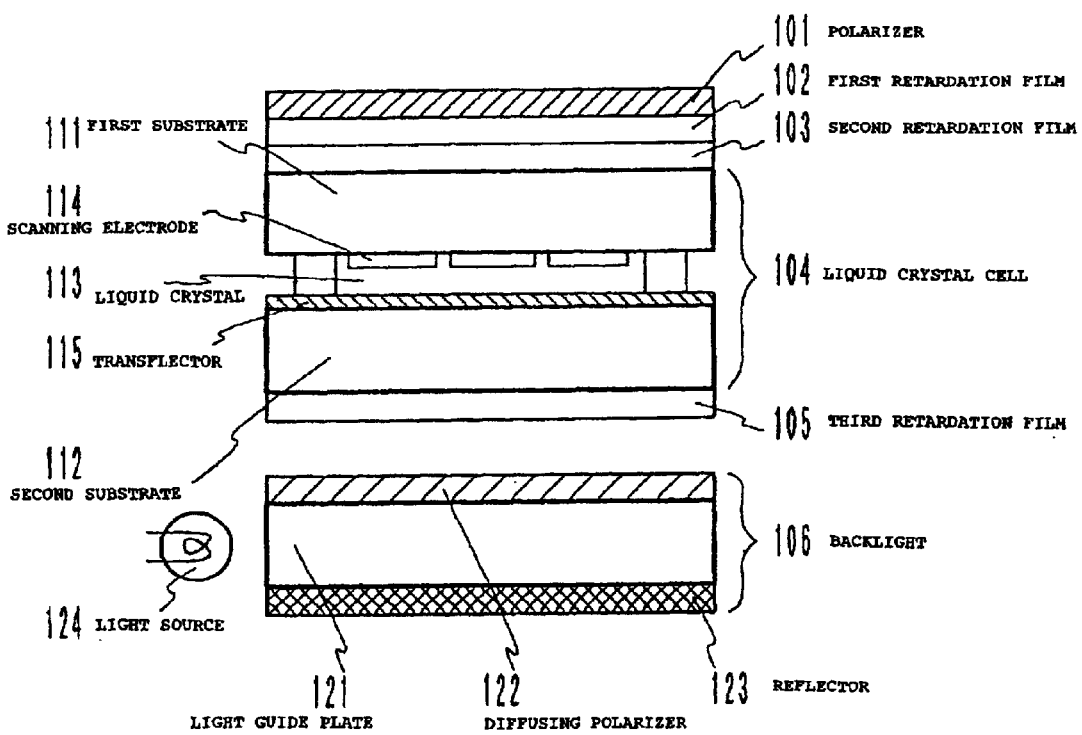
FIG. 1 is a schematic that shows a structure of a liquid crystal display according to the first embodiment of the present invention.

FIG. 1 is a schematic that shows the structure of the liquid crystal display in accordance with the present invention. In a first embodiment, a passive matrix liquid crystal display is described as an example; however, a similar configuration can also be applied to an active matrix liquid crystal display.

The configuration will be described with reference to FIG. 1. FIG. 1 shows a polarizer 101, a first retardation film 102, a second retardation film 103, a liquid crystal cell 104, a third retardation film 105, and a backlight 106. The liquid crystal cell 104 includes a first substrate 111 and a second substrate 112, a liquid crystal 113, a scanning electrode 114 disposed on an inner surface of the first substrate 111, a transflector 115 which is also used for a signal electrode disposed on an inner surface of the second substrate 112, or a transflector 115 which is separate from the signal electrode and close thereto. The backlight 106 includes a light guide plate 121, a diffusing polarizer 122 disposed on a surface on the liquid crystal cell 104 side of the light guide plate 121, a reflector 123 disposed on a surface opposite to the surface on which the diffusing polarizer 122 of the light guide plate 121 is disposed, and a light source 124.

In addition to the components shown in FIG. 1, elements including a liquid crystal alignment layer, upper and lower short-circuit preventive films, an overcoat layer, a spacer ball, a sealant, a black mask, an anti-glare film, a liquid crystal driver IC and a drive circuit may be used; however, these components make FIG. 1 complicated to understand. Since these elements are unnecessary in describing the features of the present invention, the description and illustration thereof are omitted. It should be understood that regular elements can be employed therein.

Next, each component is described below. The polarizer 101 has the function of absorbing the predetermined linearly polarized wave component and allowing the other polarized wave components to be transmitted therethrough, and can be obtained by adsorbing a two-color substance, such as iodine complex by a polyvinyl alcohol film, and drawing the film. The diffusing polarizer 122 has the function of diffusing the predetermined linearly polarized wave component and allowing the other polarized wave components to be transmitted therethrough. The diffusing polarizer 122 having a structure such that birefringent polymer particles are dispersant in an isotropic polymer, as disclosed in Japanese Unexamined Patent Application Publication No. 11-174231, Japanese Unexamined Patent Application Publication 11-509014, Japanese Patent Publication No. 2000-506989 (by PCT Application) and Japanese Patent Publication No. 2000-506990 (by PCT Application), may be used.

The first retardation film 102 and the second retardation film 103, and the third retardation film 105 can be formed of an oriented film of a polycarbonate resin or a norbornen resin having a polar group in a molecule, or a polymer liquid crystal film. The third retardation film 105 is an essential element for the present invention; however, the first retardation film 102 and the second retardation film 103 are used to compensate the coloring due to the birefringence of the liquid crystal, and only one of them may be used, or they may be omitted. The third retardation film 105 has the function of converting the linearly polarized wave into the substantially circularly polarized wave, and a ¼ wavelength plate having the retardation of about 120–180 nm or a laminate of a ¼ wavelength plate and a ½ wavelength plate are suitable therefor.

The first substrate 111 and the second substrate 112 are formed of a glass substrate or a plastic substrate. However, the liquid crystal display in accordance with the present invention achieves not only reflective mode display, but also transmissive mode display, and both substrates thereof must be transparent in the wavelength range of at least a part of the visible light.

The liquid crystal 113 is formed of a nematic liquid crystal component twisted by 0° to 300°. The twisted angle thereof is determined by the alignment direction in the first and second substrates, and the quantity of a chiral material added to the liquid crystal.

The scanning electrode 114 includes a stripe-like transparent electrode, for example, ITO. In an active matrix liquid crystal display, the scanning electrode is disposed on the second substrate side while a common electrode to the ITO is disposed over the entire surface on the first substrate side, or no electrode is disposed.

Figure 2:
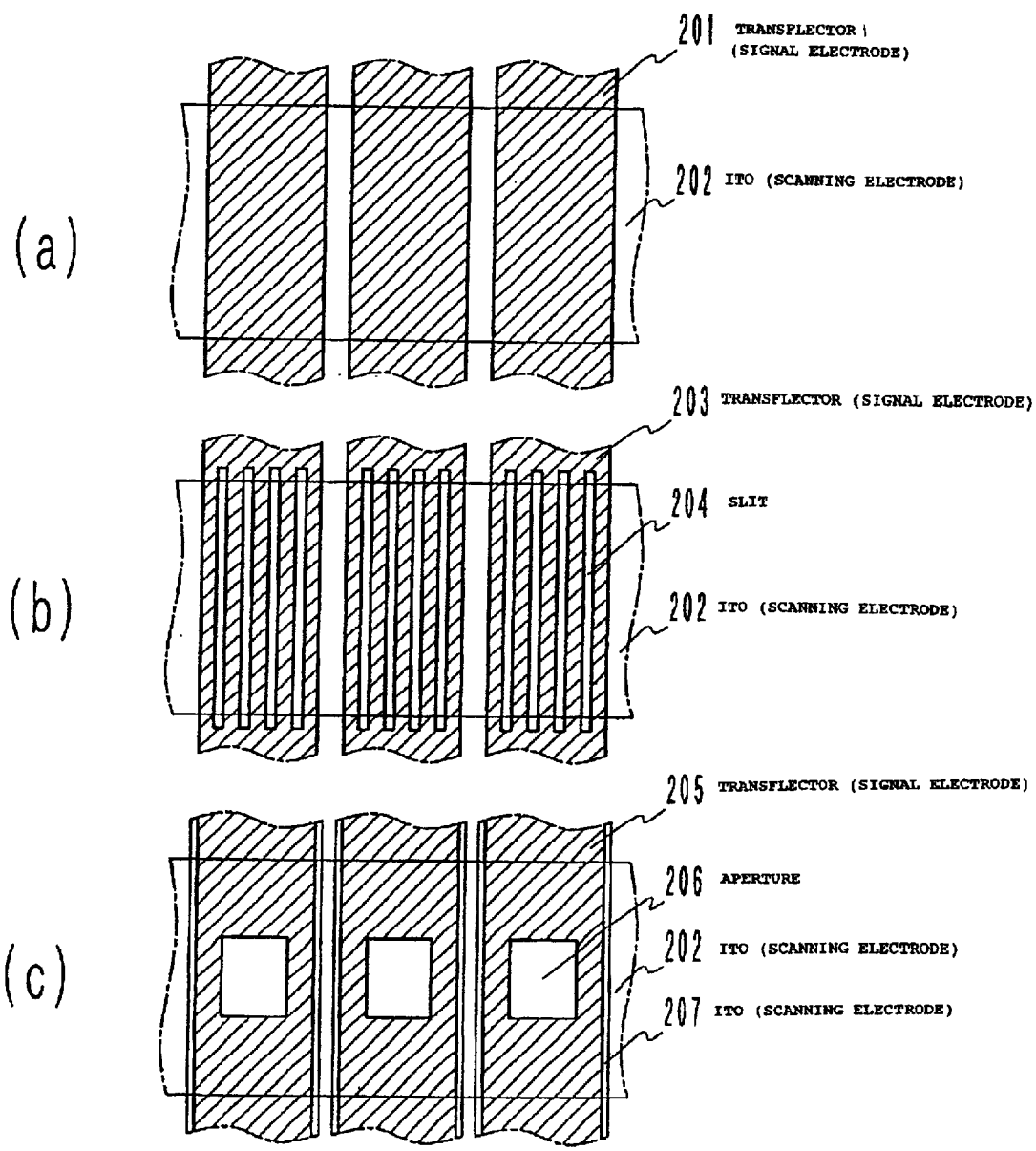
FIGS. 2(a)–2(c) are schematics that show a structure of a transflector of the liquid crystal display according to the first embodiment of the present invention.

The transflector 115 is generally formed of a film with a pearl pigment diffused in the resin; however, it is difficult to build the transflector 115 in the liquid crystal cell. Thus, three methods have been devised, as shown in FIGS. 2(a), (b) and (c), to form the transflector 115. Of course, the method for obtaining the transflector is not limited thereto, and another structure derived therefrom may be employed.

FIG. 2(a) shows a transflector 201 which is also used for a signal electrode disposed on the second substrate, and a scanning electrode 202 including the ITO disposed on the first substrate, and an area in which these two electrodes are intersected with each other is referred to as a pixel area (dot). A hatching area of the transflector 201 is an Al sputter film of a thickness of 200 Å, and functions as the transflector to allow about 8% of the light to be transmitted therethrough, and reflect the remaining light.

FIG. 2(b) shows a transflector 203 which is also used for a signal electrode disposed on the second substrate, and a scanning electrode 202 including the ITO disposed on the first substrate. A hatching area of the transflector 203 is an Al sputter film of a thickness of 2000 Å, and allows little light to be transmitted therethrough; however, a plurality of slits 204 of a width of 2 µm are provided, and the light incident in the slit areas is transmitted therethrough. The liquid crystal of the slit areas 204 is operated substantially in the same manner as the area on the Al film by the oblique electric field generated between the scanning electrodes facing each other, and the transmissive mode display is thereby achieved. However, the threshold voltage for the transmissive mode display is changed by about 0.04 V every time the slit width is changed by 1 µm, and thus, particularly in the passive matrix drive, the slit width must be controlled precisely.

FIG. 2(c) shows an example in which the signal electrode is separate from the transflector, and FIG. 2(c) shows a transflector 205 disposed on the second substrate, a signal electrode 207 including the ITO disposed to cover the entire surface of the transflector 205, and a scanning electrode 202 including the ITO disposed on the first substrate. A hatching area of the transflector 205 is also an Al sputter film of a thickness of 2000 Å, and only a small amount of light is transmitted therethrough; however, an aperture 206 is provided therein, and the light from the area is transmitted. A scanning electrode 207 including the ITO is covered on the transflector 205 via an $SiO_2$ insulating film, and the liquid crystal of the aperture 206 is normally operated, enabling the transmissive mode display.

Each component is described below referring again to FIG. 1.

The backlight 106 has a structure of the light guide plate 121 combined with the light source 124, and the diffusing polarizer 122 is optically adhered to an upper surface of the light guide plate 121. In addition, a diffusing plate and/or a collective prism may be laminated thereon. A reflector 123 including a metal thin film or a dielectric multi-layer film is disposed on a reverse side of the light guide plate 121. The light source 124 includes a cold cathode ray tube or an LED.

Although not shown in FIG. 1, in order to obtain the color display, a color filter must be disposed corresponding to each dot. When the transflector achieves the mirror reflection, a forward diffusing plate must be disposed between the polarizer 101 and the transflector 115. The forward diffusing plate can be formed of a film including two small areas of different refractive indexes. When the transflector achieves the scattering reflection, the forward diffusing plate may be omitted.

Figure 3:
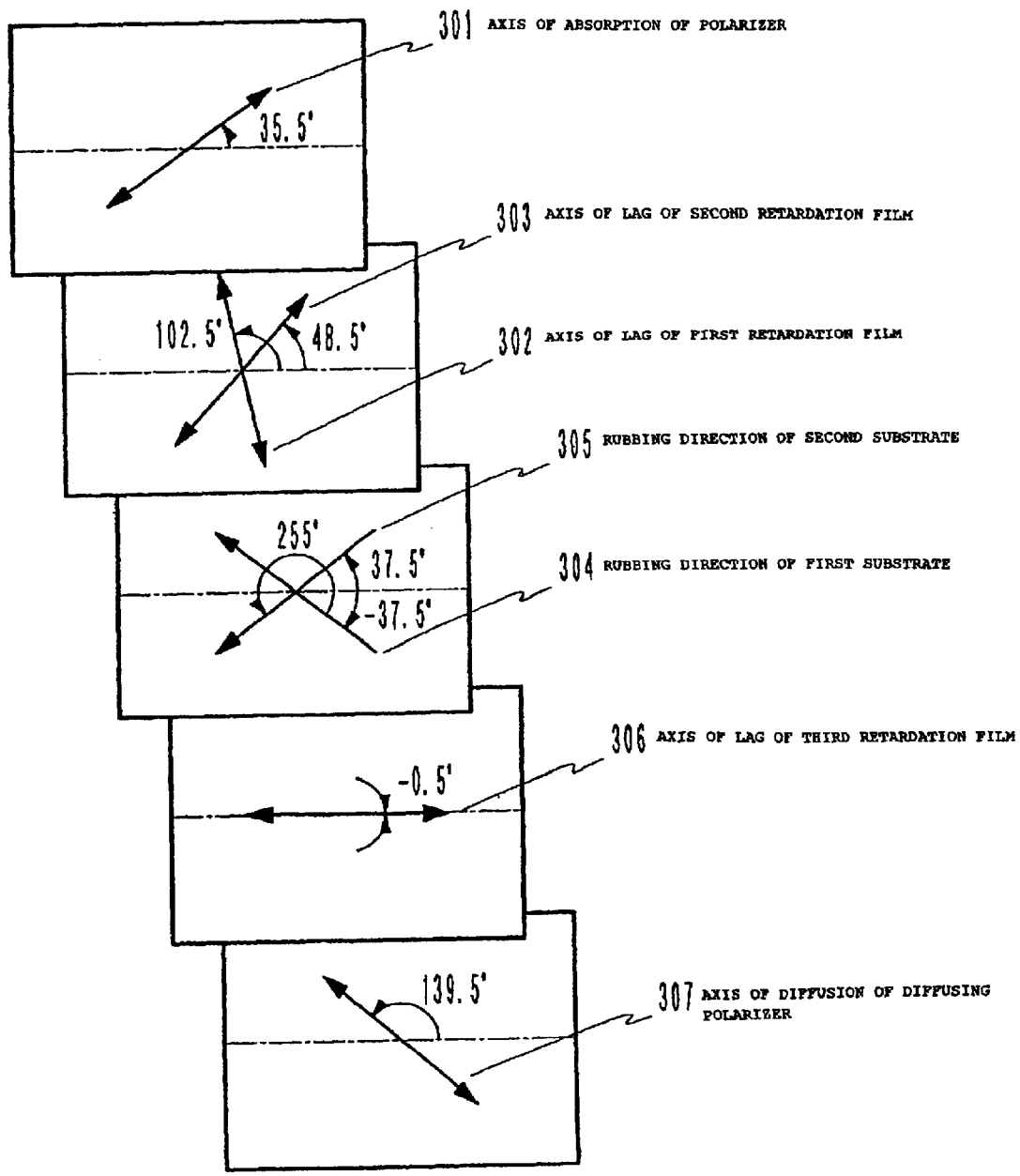
FIG. 3 is a schematic that shows a cell condition of the liquid crystal display according to the first embodiment of the present invention.

Next, the cell condition of the liquid crystal display according to the present embodiment will be described with reference to FIG. 3. In FIG. 3, five laminated rectangles show each layer of the first polarizer 101, the first and second retardation films 102, 103, the liquid crystal cell 104, the third retardation film 105 and the diffusing polarizer 122 in this order from the top, and each axial direction is indicated by an arrow depicted on each rectangle.

The direction 301 of the axis of absorption of the first polarizer is at an angle of 35.5° to the left with respect to the longitudinal direction of the panel. The direction 302 of the axis of lag of the first retardation film is at an angle of 102.5° to the left with respect to the longitudinal direction of the panel, and the retardation thereof is 455 nm. The direction 303 of the axis of lag of the second polarizer is at an angle of 48.5° to the left with respect to the longitudinal direction of the panel, and the retardation thereof is 544 nm. The rubbing direction 304 of the first substrate of the liquid crystal cell is at an angle of 37.5° to the right with respect to the longitudinal direction of the panel. The rubbing direction 305 of the second substrate of the liquid crystal cell is at an angle of 37.5° to the left with respect to the longitudinal direction of the panel. The liquid crystal is twisted counterclockwise toward the second substrate from the first substrate by 255°. The product of the birefringence $\Delta n$ by the cell gap d is 0.90 µm. The direction 306 of the axis of lag of the third retardation film is 0.5° to the right with respect to the longitudinal direction of the panel, and the retardation thereof is 140 nm. The direction 307 of the axis of scatter of the diffusing polarizer is 139.5° to the left with respect to the longitudinal direction of the panel.

Figure 4:
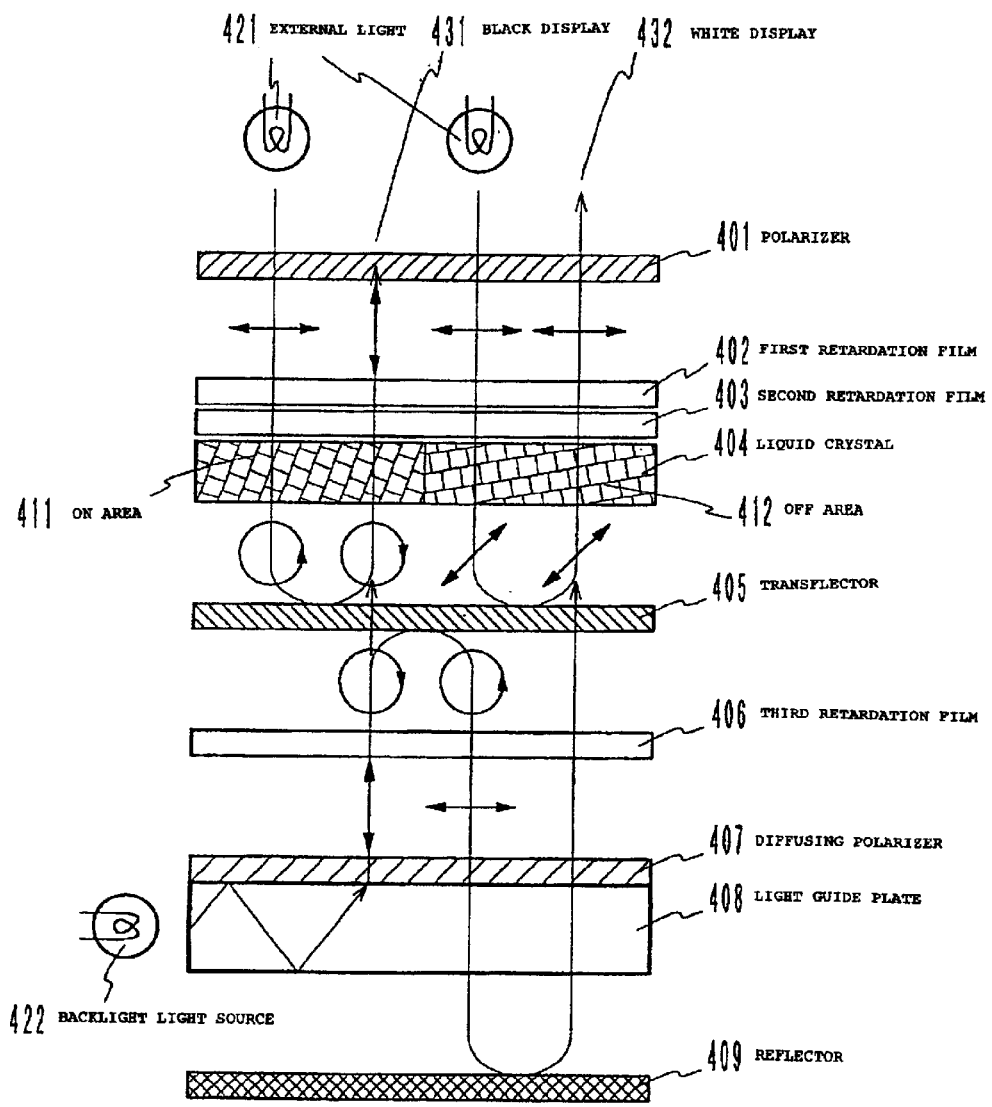
FIG. 4 is a schematic explaining the operating principle of the liquid crystal display according to the first embodiment of the present invention.

Next, the operating principle of the liquid crystal display according to the present embodiment is described with reference to FIG. 4. FIG. 4 shows a polarizer 401, a first retardation film 402, a second retardation film 403, a liquid crystal 404, a transflector 405, a third retardation film 406, a diffusing polarizer 407, a light guide plate 408, and a reflector 409. In addition, an ON area 411 of the liquid crystal 404 and an OFF area 412 of the liquid crystal 404 are shown.

The operation of the reflective mode display is similar to that of a conventional technology. The external light 421 is converted into the linearly polarized wave by the polarizer 401, transmitted through the first retardation film 402, the second retardation film 403 and the liquid crystal 404, and converted into a circularly polarized wave in the ON area 411 and into a linearly polarized wave in the OFF area 412. Thereafter, the polarized wave is reflected by the transflector 405, and transmitted through the liquid crystal 404, the second retardation film 403 and the first retardation film 402 to realize the black display 431 in the ON area 411, and the white display 432 in the OFF area 412.

Next, the transmissive mode display is described below. The light emitted from the backlight light source 422 is emitted to the liquid crystal cell side with only the polarized wave component parallel to the axis of scatter of the diffusing polarizer 407 diffused, while repeating the total reflection in the light guide plate 408. The polarized wave component orthogonal to the axis of scatter of the diffusing polarizer 407 is finally diffused by the diffusing polarizer 407 and emitted while changing the polarized state by the retardation of the diffusing polarizer 407 and the light guide plate 408. Thus, the linearly polarized wave emitted to the liquid crystal cell side is converted into the circularly polarized wave by the third retardation film 406. Black display can be achieved in the ON area 411 and the slightly dark white display can be achieved in the OFF area 412 by setting this circularly polarized wave in the same rotational direction as that of the circularly polarized wave, when the external light incident in the ON area of the liquid crystal in the reflective mode display is reflected by the transflector 405. On the other hand, the circularly polarized wave reflected downward by the transflector 405 is reflected by the reflector 409, and returned again to the transflector 405. By repeating this operation, most of the light from the backlight can be transmitted through the transflector 405.

In the above configuration according to the present embodiment, a transflective liquid crystal display having the transmissivity close to four times that of the conventional value can be provided. On the other hand, a transflective liquid crystal display of brighter reflective mode display than that of the conventional value can be provided by reducing the transmissivity of the transflector, accordingly.

(Second Embodiment)

Next, the liquid crystal display according to the second embodiment of the present invention will be described. In the above-described liquid crystal display according to the first embodiment, the contrast is not sufficient even though the transmissive mode display becomes brighter. Thus, in the liquid crystal display according to the present embodiment, a reflective mode display with high contrast is obtained by further disposing a retardation film between a light guide plate and a reflector.

Figure 5:
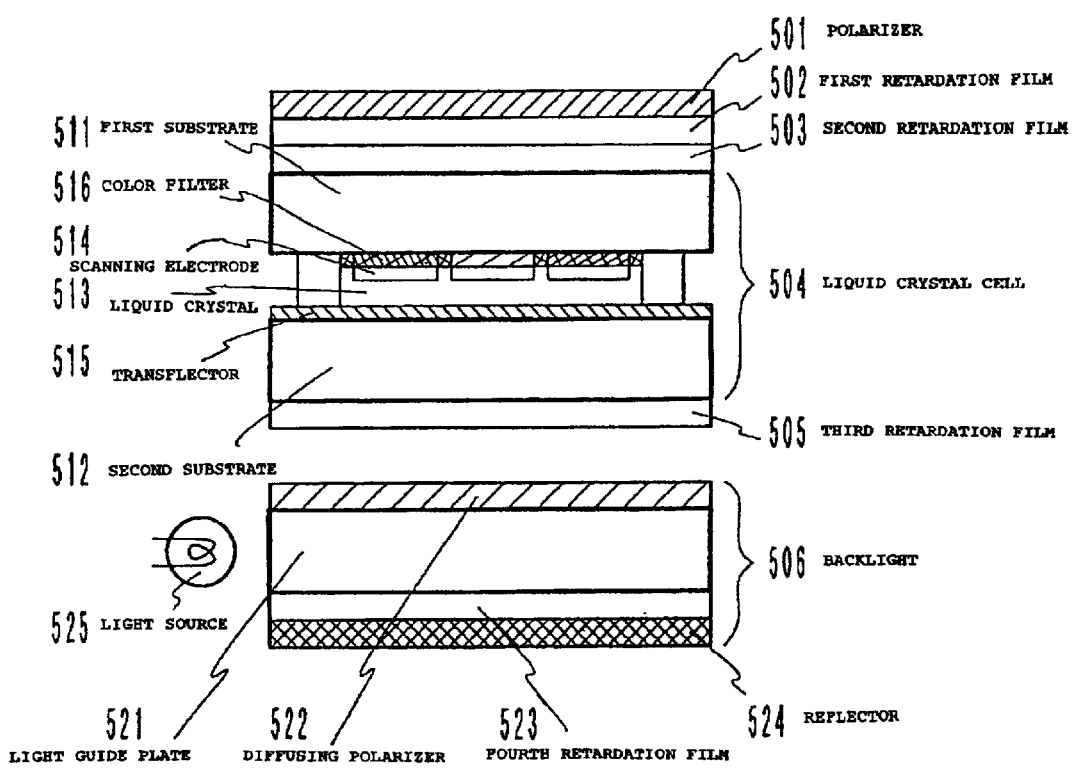
FIG. 5 is a schematic that shows a structure of a liquid crystal display according to the second embodiment of the present invention.

FIG. 5 shows the structure of the liquid crystal display according to the second embodiment of the present invention. Here, in particular, a passive matrix liquid crystal display will be described as an example. FIG. 5 shows a polarizer 501, a first retardation film 502, a second retardation film 503, a liquid crystal cell 504, a third retardation film 505 and a backlight 506. The liquid crystal cell 504 includes a first substrate 511 and a second substrate 512, liquid crystal 513, a scanning electrode 514 disposed on an inner surface of the first substrate 511, a transflector 515 which is also used for a signal electrode disposed on an inner surface of the second substrate 512, and a micro color filter 516. The backlight 506 includes a light guide plate 521, a diffusing polarizer 522 disposed on a surface on the liquid crystal cell 504 side of the light guide plate 521, a fourth retardation film 523 disposed on a surface opposite to the surface on which the diffusing polarizer 522 of the light guide plate 521 is disposed, a reflector 524 and a light source 525.

Next, each component is described below. The fourth retardation film 523, similar to the third retardation film 505, has a function of converting the linearly polarized wave into a substantially circularly polarized wave, and may include a ¼ wavelength plate formed of a polycarbonate resin oriented film or the like. The reflector 524 of the backlight 506 includes a metal film or a dielectric multi-layer film, and preferably has the mirror reflection that does not disturb the polarized wave. The color filter 516 of higher transmissivity and lighter color than the type used in a transmissive color liquid crystal display is used in order to obtain a brighter display even in the reflective mode display. A black mask may be disposed as necessary. This color filter 516 can be disposed on the transflector 515 on the second substrate side. Other components are similar to those according to the first embodiment.

Figure 6:
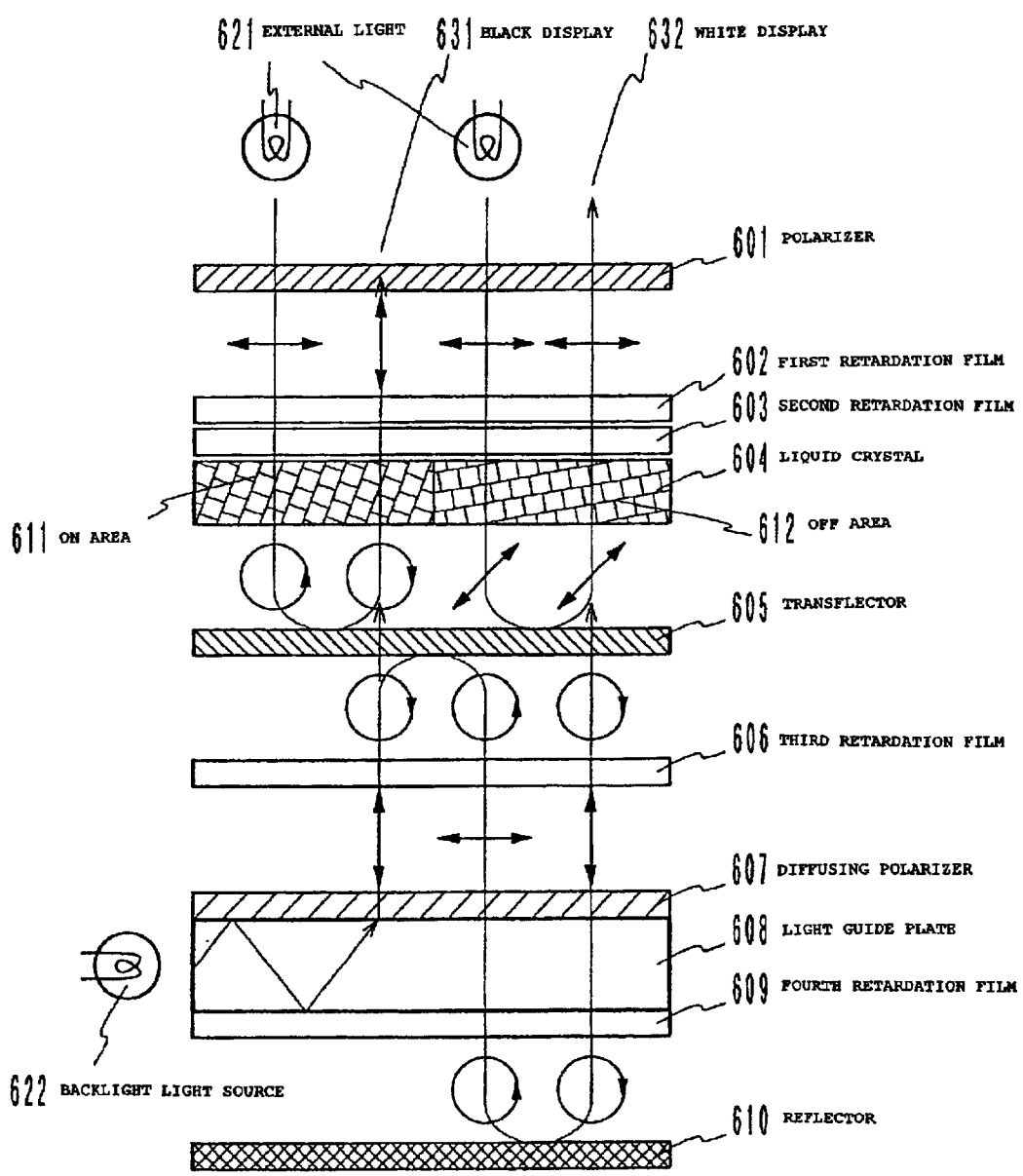
FIG. 6 is a schematic explaining the operating principle of the liquid crystal display according to the second embodiment of the present invention.

Next, the operating principle of the liquid crystal display according to the present embodiment will be described with reference to FIG. 6. FIG. 6 shows a polarizer 601, a first retardation film 602, a second retardation film 603, a liquid crystal 604, a transflector 605, a third retardation film 606, a diffusing polarizer 607, a light guide plate 608, a fourth retardation film 609, and a reflector 610. An ON area 611 of the liquid crystal 604, and an OFF area 612 of the liquid crystal 604 are also shown.

The operation of the reflective mode display is similar to that of a conventional technology. The external light 621 is converted into the linearly polarized wave by the polarizer 601, transmitted through the first retardation film 602, the second retardation film 603 and the liquid crystal 604, and converted into a circularly polarized wave in the ON area 611 and into the linearly polarized wave in the OFF area 612. Thereafter, the polarized wave is reflected by the transflector 605, and transmitted through the liquid crystal 604, the second retardation film 603 and the first retardation film 602 to realize the black display 631 in the ON area 611, and the white display 632 in the OFF area 612.

Next, the transmissive mode display is described below. The light emitted from the backlight light source 622 is emitted to the liquid crystal cell side with only the polarized wave component parallel to the axis of scatter of the diffusing polarizer 607 diffused, while repeating the total reflection in the light guide plate 608. The polarized wave component orthogonal to the axis of scatter of the diffusing polarizer 607 is finally diffused by the diffusing polarizer 607 and emitted while changing the polarized state by the retardation of the diffusing polarizer 607 and the light guide plate 608. The linearly polarized wave emitted to the liquid crystal cell side is converted into a circularly polarized wave in the same rotational direction as that in the ON area 611 of the reflective mode display, for example, clockwise, by the third retardation film 606. Thus, the light transmitted through the transflector 605 achieves the black display in the ON area 611 and the slightly dark white display in the OFF area 612. On the other hand, the light reflected downward by the transflector 605 becomes a circularly polarized wave counterclockwise, and converted into the linearly polarized wave orthogonal to the linearly polarized wave emitted from the backlight first by the third retardation film 606, optically rotated by 90° by the fourth retardation film 609 and the reflector 610, and converted again into the clockwise circularly polarized wave by the third retardation film 606 and reaches the transflector 605. By repeating this operation, most of the light from the backlight can be transmitted through the transflector 605 as the clockwise circularly polarized wave.

In the above configuration according to the present embodiment, a transflective color liquid crystal display having transmissivity that is close to four times that of the conventional value and with high contrast can be provided.

(Third Embodiment)

Next, three examples of electronic apparatus according to the third embodiment of the present invention will be described. The liquid crystal displays in accordance with the present invention are used under diversified environments, and suitable for portable apparatus requiring low power consumption.

Figure 7:
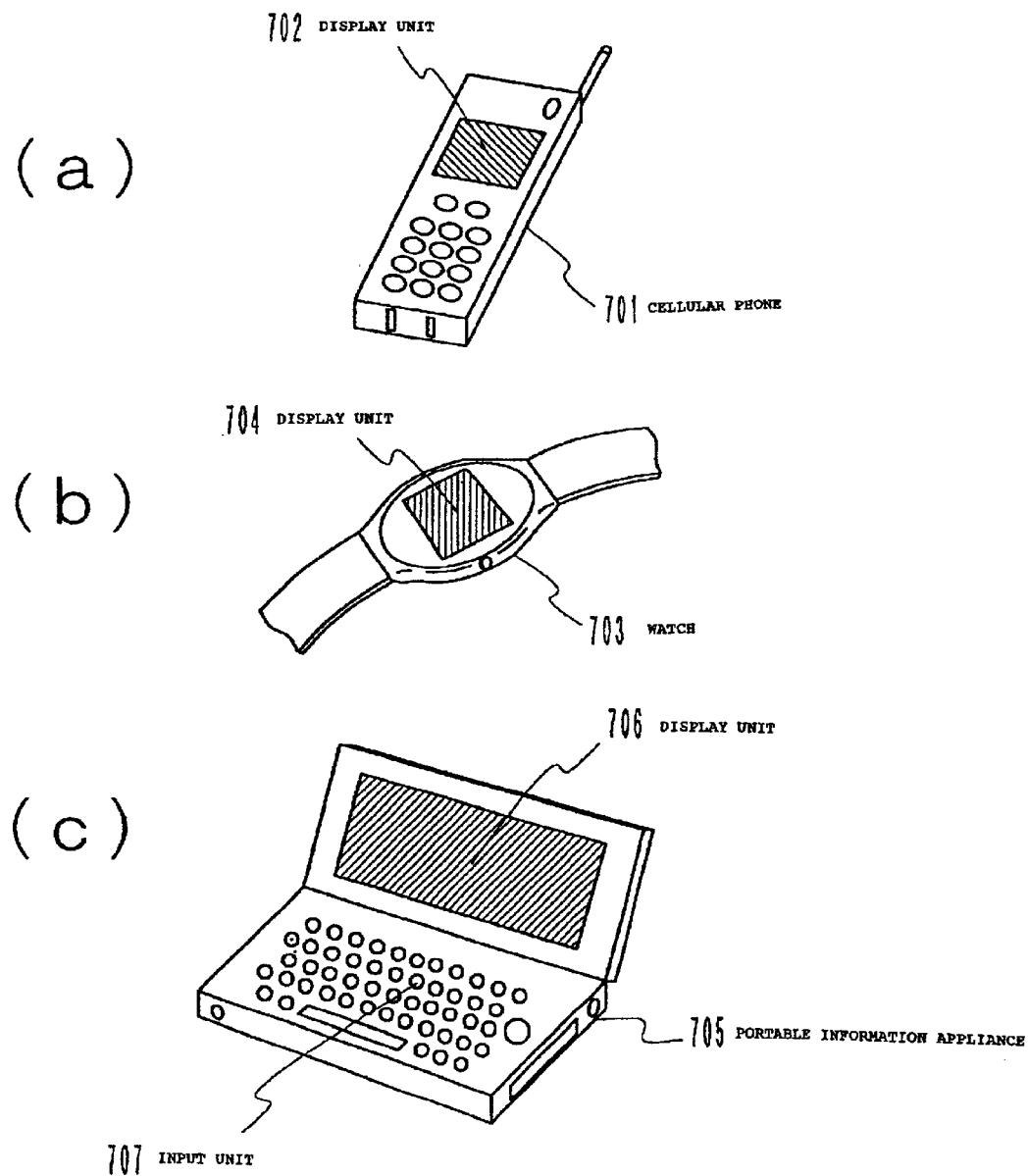
Figure 8:
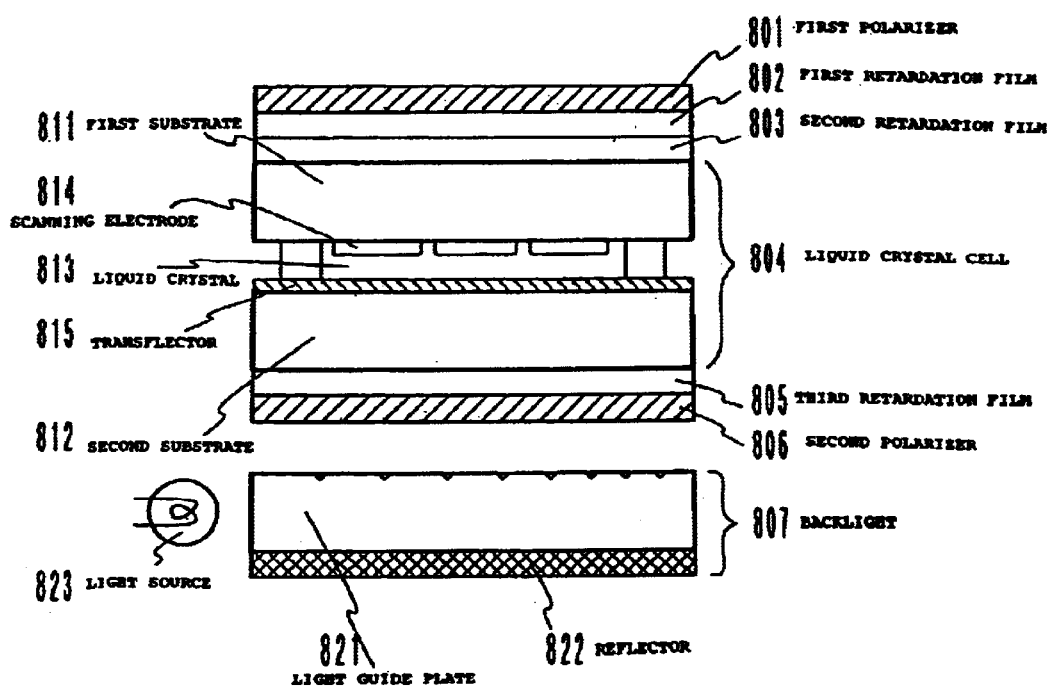
FIG. 8 is a schematic that shows a structure of the liquid crystal display of a conventional technology.

FIG. 7(a) shows a cellular phone 701, and a display unit 702 is disposed on an upper frontal portion of a body. Cellular phones are used in any environment, such as indoors and outdoors. In particular, they are often used in cars, and it is very dark inside of a car at night. Thus, the liquid crystal display used for the cellular phones is preferably a transflective liquid crystal display which can usually achieve the reflective mode display with small power consumption, and the transmissive mode display making use of the auxiliary light as necessary. The liquid crystal display in accordance with the present invention is particularly brighter and higher in contrast in the transmissive mode display than that of the conventional liquid crystal display, and is much more easily recognizable.

FIG. 7(b) shows a watch 703, and a display unit 704 is disposed in the center of a body. An important point in applications to watches is low power consumption. If the liquid crystal display in accordance with the present invention is used, the transmissive mode display that is as bright as that of the conventional display can be ensured even when a dark backlight light source of small power consumption is used, and a watch of long battery life can be realized.

FIG. 7(c) shows a portable information apparatus 705, and a display unit 706 and an input unit 707 are disposed on an upper side and a lower side of a body, respectively. Reflective monochrome liquid crystal displays have been extensively used in conventional portable information apparatus. This is because the transmissive color liquid crystal displays constantly use the backlight, and the power consumption thereof is large, and the continuous running time thereof is short. Even in such cases, if the transflective color liquid crystal display according to the second embodiment of the present invention is used, the color display can be realized with small power consumption, and portable information apparatus that are considerably more convenient can be obtained.

As described above, by making use of the backlight having the diffusing polarizer in accordance with the present invention, the light reflected by the transflector is recycled to enhance efficiency of utilization of the light, and a transflective liquid crystal display of high transmissivity can be provided. In addition, the transflective liquid crystal display of higher reflectance can be provided by reducing the transmissivity of the transflector by the enhancement in transmissivity through recycling.

What is claimed is:

1. A liquid crystal display, comprising:
   a pair of substrates;
   a liquid crystal cell having a liquid crystal disposed between the pair of substrates;
   a transflector disposed inside of said liquid crystal cell;
   a backlight disposed outside of said liquid crystal cell, said backlight including a light guide plate having one side and another side, a light source, a diffusing polarizer disposed on the one side of said light guide plate, and a reflector disposed on the other side of said light guide plate; and
   a retardation film disposed between said liquid crystal cell and said backlight, wherein said diffusing polarizer polarizes said backlight into linearly polarized light having two components, diffuses said first component of said linearly polarized light and transmits said second component of said linearly polarized light.

2. The liquid crystal display according to claim 1, further comprising a retardation film disposed between said light guide plate of said backlight and said reflector.

3. An electronic apparatus, comprising:
   the liquid crystal display according to claim 1.

4. An electronic apparatus, comprising:
   the liquid crystal display according to claim 2.

5. The liquid crystal display according to claim 1, wherein said diffusing polarizer is disposed on a surface said light guide plate facing toward said liquid crystal cell.

* * * * *